(12) United States Patent
Koss et al.

(10) Patent No.: US 10,771,965 B1
(45) Date of Patent: Sep. 8, 2020

(54) SYSTEMS AND METHODS FOR PHOTO RECOGNITION-BASED IDENTITY AUTHENTICATION

(71) Applicant: LexisNexis Risk Solutions Inc., Alpharetta, GA (US)

(72) Inventors: Yaniv Koss, Be'er Sheva (IL); Benny Rotem, D.N. Hanegev (IL); Bryan Knauss, Milton, GA (US)

(73) Assignee: LexisNexis Risk Solutions Inc., Alpharetta, GA (US)

( * ) Notice: Subject to any disclaimer, the term of this patent is extended or adjusted under 35 U.S.C. 154(b) by 0 days.

(21) Appl. No.: 16/738,042

(22) Filed: Jan. 9, 2020

(51) Int. Cl.
*H04W 12/02* (2009.01)
*H04W 12/04* (2009.01)
*H04L 29/06* (2006.01)
*G06F 21/36* (2013.01)
*G06F 21/62* (2013.01)
*G06F 16/535* (2019.01)

(52) U.S. Cl.
CPC .......... *H04W 12/02* (2013.01); *G06F 16/535* (2019.01); *G06F 21/36* (2013.01); *G06F 21/6245* (2013.01); *H04L 63/08* (2013.01); *G06F 2221/2103* (2013.01)

(58) Field of Classification Search
CPC .. H04W 12/02; H04W 12/06; H04L 63/0428; H04L 67/06; G06F 21/64
USPC .......................................................... 726/28
See application file for complete search history.

(56) References Cited

U.S. PATENT DOCUMENTS

| | | | |
|---|---|---|---|
| 9,195,679 B1 * | 11/2015 | Svendsen ................ G06Q 50/01 |
| 9,538,021 B2 * | 1/2017 | Takaoka .................. H04L 51/04 |
| 9,613,190 B2 * | 4/2017 | Ford ....................... G06F 21/10 |
| 9,625,720 B2 * | 4/2017 | Nohara ...................... G01S 7/04 |
| 9,852,491 B2 * | 12/2017 | Yim ......................... G06T 11/60 |
| 10,033,702 B2 * | 7/2018 | Ford ..................... H04L 63/083 |
| 10,043,035 B2 * | 8/2018 | LaFever .............. H04L 63/1441 |
| 10,139,820 B2 * | 11/2018 | Liu ....................... G05D 1/0038 |
| 10,168,695 B2 * | 1/2019 | Barnickel .......... H04B 7/18506 |
| 10,305,895 B2 | 5/2019 | Barry et al. |
| 10,572,684 B2 * | 2/2020 | LaFever ................. G16H 10/60 |
| 2013/0187834 A1 * | 7/2013 | Nohara ..................... G01S 7/04 345/8 |
| 2014/0306999 A1 * | 10/2014 | Yim ....................... G06K 9/726 345/635 |

(Continued)

OTHER PUBLICATIONS

Rabkin, Ariel. (2008). Personal Knowledge Questions for Fallback Authentication: Security Questions in the Era of Facebook. In SOUPS 2008: Proceedings of the 4th Symposium on Usable Privacy and Security, vol. 23. 13-23. 10.1145/1408664.1408667.

*Primary Examiner* — William D Cumming
(74) *Attorney, Agent, or Firm* — Troutman Pepper Hamilton Sanders LLP; James E. Schutz; Mark Lehi Jones

(57) ABSTRACT

A combination of target images and control images are presented to a user device for selection by the user. Based on a correct selection of images that the user either recognizes or does not recognize, the user may be authenticated. Target images have some connection to a legitimate user in a way that a legitimate user may recognize the target image. Control images have no known connection to the legitimate user, such that they would not typically be recognized by the legitimate user. The legitimacy of a user may be determined based on images selected and/or not selected, depending on accompanying instructions for selection.

18 Claims, 6 Drawing Sheets

(56) References Cited

U.S. PATENT DOCUMENTS

| | | | |
|---|---|---|---|
| 2015/0310012 A1* | 10/2015 | Kim | G06F 16/22 |
| | | | 707/722 |
| 2015/0310188 A1* | 10/2015 | Ford | H04L 63/0428 |
| | | | 726/28 |
| 2017/0041296 A1* | 2/2017 | Ford | H04W 12/06 |
| 2017/0243028 A1* | 8/2017 | LaFever | G06F 21/6263 |
| 2017/0318438 A1* | 11/2017 | Chien | G06K 9/00771 |
| 2017/0346851 A1 | 11/2017 | Drake | |
| 2017/0371525 A1* | 12/2017 | Xie | G06F 3/04845 |
| 2018/0307859 A1* | 10/2018 | LaFever | G16H 10/60 |
| 2018/0367506 A1* | 12/2018 | Ford | H04W 12/02 |
| 2019/0147292 A1* | 5/2019 | Watanabe | G06F 16/7837 |
| | | | 382/103 |
| 2019/0222560 A1* | 7/2019 | Ford | G06F 21/64 |
| 2019/0332807 A1* | 10/2019 | LaFever | G06F 21/6254 |
| 2020/0074111 A1* | 3/2020 | Mitchell | H04L 67/06 |

\* cited by examiner

SYSTEMS AND METHODS FOR PHOTO RECOGNITION-BASED IDENTITY AUTHENTICATION

FIELD

This disclosed technology generally relates to identity authentication and to identity authentication utilizing images recognizable by a legitimate user.

BACKGROUND

Identity fraud presents difficult challenges for business entities or governmental agencies who unknowingly open or allow access to accounts, or who are deceived into providing products/services based on synthetic, stolen, or manipulated identity information. Therefore, such entities/agencies typically have a need to authenticate their customer's identities to avoid losses due to perpetrators of identity-related fraud.

Identity verification is often used to ensure that users provide information that is uniquely associated with their real identity. Certain forms of identity verification may rely on physical or documentary documents, such as a driver's license, utility bill, etc. However, many online authentication scenarios exist where physical documentary verification is not feasible or convenient. In such cases, non-documentary information can be provided by a user and utilized for identity verification. However, fraud perpetrators may attempt to overcome the identity verification by providing synthetic, stolen, or manipulated identity information.

Knowledge-based authentication (KBA) is an authentication process that can provide enhanced security and can be effective in thwarting fraudsters. KBA is a process in which the user is asked to answer at least one question based on the user's own knowledge. A good KBA question should not be easily guessed or determined through research, and it should have only one correct answer that a user can easily remember. The form and content of the KBA question, therefore, can vary widely, with a corresponding wide range of usability and effectiveness. However, traditional KBA is becoming less effective due to the relative ease in which answers to the typical KBA questions (e.g., maiden names, dates of birth, etc.,) can be determined by a quick Internet search.

Technically well-informed fraud perpetrators continue to develop sophisticated deception schemes to target authentication techniques that were once thought to be secure. Balancing the threats of identity fraud with efficient service for legitimate clients continues to present significant challenges for businesses and governmental agencies.

BRIEF SUMMARY

Some or all the above needs may be addressed by certain implementations of the disclosed technology. Systems and methods are disclosed herein for implementing an authentication process that utilizes target images and control images such that the target images may be quickly recognizable and differentiated from the control images by a legitimate user. Certain implementations may further impose a time limit for identifying correct images to provide an efficient and secure authentication process.

In an example implementation, a computer-implemented method is provided that includes receiving a set of identity information associated with a user; querying one or more databases with at least a portion of the set of identity information; receiving, in response to the querying, independent personally identifiable information (PII) associated with the user; retrieving, based at least in part on the PII, one or more target images having a connection to the PII, the one or more target images categorized by subject classification; retrieving a set of control images having subject classifications corresponding to the one or more target images; sending, for display on a computing device associated with the user, the one or more target images and the corresponding set of control images with instructions for user selection; receiving, responsive to the sending, a selection response; and responsive to receiving one or more correct selection responses, sending, for display on the computing device associated with the user, an indication of authentication.

According to another example implementation, a system is provided. The system includes at least at least one memory for storing data and computer-executable instructions; and at least one processor configured to access the at least one memory and further configured to execute the computer-executable instructions that cause the at least one processor to: receive a set of identity information associated with a user; query one or more databases with at least a portion of the set of identity information; receive, in response to the query, independent personally identifiable information (PII) associated with the user, retrieve, based at least in part on the PII, one or more target images having a connection to the PII, the one or more target images categorized by subject classification; retrieve a set of control images having subject classifications corresponding to the one or more target images; send, for display on a computing device associated with the user, the one or more target images and the corresponding set of control images with instructions for user selection; receive, responsive to the sending, a selection response; and responsive to receiving one or more correct selection responses, send, for display on the computing device associated with the user, an indication of authentication.

According to another example implementation, computer-readable media is provided. The computer-readable media includes computer-executable instructions that, when executed by one or more processors, cause the one or more processors to perform a method comprising: receiving a set of identity information associated with a user; querying one or more databases with at least a portion of the set of identity information; receiving, in response to the querying, independent personally identifiable information (PII) associated with the user; retrieving, based at least in part on the PII, one or more target images having a connection to the PII, the one or more target images categorized by subject classification; retrieving a set of control images having subject classifications corresponding to the one or more target images; sending, for display on a computing device associated with the user, the one or more target images and the corresponding set of control images with instructions for user selection; receiving, responsive to the sending, a selection response; and responsive to a correct selection response, sending, for display on the computing device associated with the user, an indication of authentication.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
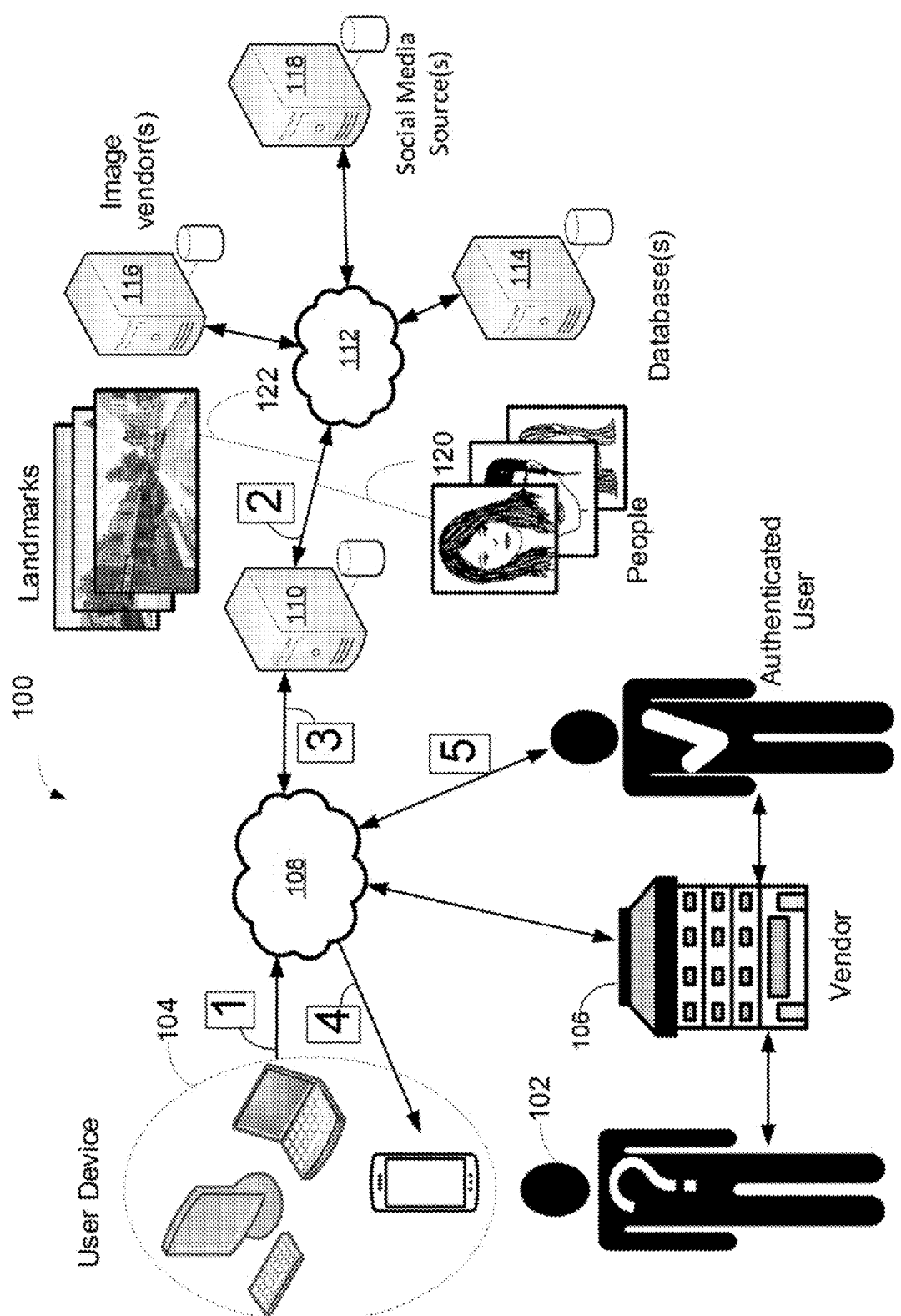
FIG. 1 is a block diagram of an illustrative identity authentication process 100 according to an example implementation of the disclosed technology.

The disclosed technology can provide improved and efficient authentication security by retrieving and presenting a combination of target images and control images to a user device for selection by the user. Based on a correct selection of images that the user either recognizes or does not recognize, the user may be authenticated. Target images, as defined herein, are images having some connection to a legitimate user in a way that a legitimate user may recognize the target image. Control images, as defined herein, are images that have no known connection to the legitimate user, such that they would not typically be recognized by the legitimate user. A legitimate user, as defined herein, is a person who represents their true identity, for example, in the process of identity verification (as opposed to a fraudster who may misrepresent their identity as someone else). In certain exemplary implementations, the legitimacy of a user may be determined based on images selected and/or not selected, depending on accompanying instructions for selection.

The combination of the target images and/or the control images, for example, may be presented for display on a user device as a group of images having the same subject classification, (i.e., similarly-categorized images) for multiple-choice selection by the user. The target and control images, for example, may be selected and assembled for presentation such that each of the multiple-tile images on a given question pane share a common category with the other corresponding images on the pane. Target images and control images may be categorized by subject classification based on their content, such as a landmark, a street, a neighborhood, a building, a residence, a business, a church, a man-made object, natural terrain, a person, an animal, a vehicle, a product, an advertisement, etc. In certain implementations, one or more question panes having multiple images (including various combinations of target images and/or control images) may be presented with instructions for selection, for example, that direct the user to select recognizable images and/or unrecognizable images. In certain implementations, images (including various combinations of target images and/or control images) may be presented for display sequentially (one at a time) with instructions for the user to indicate recognizable images and/or unrecognizable images. Authentication of the user may be provided based on a correct selection response by the user, i.e., correctly identifying the images according to the instructions for selection.

In accordance with certain exemplary implementations of the disclosed technology, the target images are "special" in the sense that they may have a direct connection to personally identifiable information (PII) associated with a legitimate user. The PII, for example, may be derived independently based on a set of identity information provided by a user who is requesting authorization. Such identity information can include name, address, date of birth, etc., which could be relatively easy for a fraudster to obtain. Thus, certain example implementations may include another layer of security in which the provided identity information is utilized to retrieve independent PII, which may in turn, be utilized to retrieve one or more target images. In certain exemplary implementations, the retrieved target images relate to the PII, but may not necessarily be retrieved based solely on the set of identity information provided by the user, which by design, may make it significantly more difficult for a non-legitimate user to pass authentication.

Implementations of the disclosed technology will be described more fully hereinafter with reference to the accompanying drawings, in which various embodiments of the disclosed technology are depicted. This disclosed technology may, however, be embodied in many different forms and should not be construed as limited to the implementations set forth herein; rather, these implementations are provided so that this disclosure will be thorough and complete, and will convey the scope of the disclosed technology to those skilled in the art.

FIG. 1 depicts an illustrative identity authentication process 100 that may be used to verify the identity of a user 102 using the process described herein. The user 102, for example, may provide identity information for initiating an identity verification and/or authentication process 100 using one or more communication channels and/or devices 104. For example, in one implementation, the set of identity information may include basic details, such as a name, address, date of birth, social security number, location, etc. In certain example embodiments, the user 102 may provide a set of identity information via a desktop computer, smartphone, laptop computer, tablet-computing device, etc. In certain example implementations, all or a portion of the set of identity information may be input directly into one or more webpage forms for online processing. In certain example implementations, all or part of the set of identity information related to the user 102 may be stored with a vendor 106 and/or a server 110 for subsequent retrieval and use.

In an example implementation, the received set of identity information may also include information that may directly or indirectly identify certain characteristics about the communication channel and/or device 104 used by the user 102, such as a phone number, IP address, MAC address, location, signal-to-noise, unique browser configuration, operating system, installed fonts, installed plug-ins, etc. In an example implementation, the characteristics about the communication channel or device 104 may be utilized in conjunction with the basic details received from the user 102 to determine one or more of:

- if the received phone number associated with the communication channel or device 104 differs or is altered in some way from the originating device phone number (i.e. spoofed);
- if the user's 102 communication device 104 is located where it would be expected to be (i.e., within the home city or state of the user 102);
- if the user's 102 communication device 104 is located in a region associated with a high crime rate;
- if the user's 102 communication device 104 is located in a foreign country;
- details about the user's 102 communication device 104 (i.e., device fingerprinting) that may be corroborated by independent information.

Certain implementations of the identity authentication process 100 may be described in terms of multiple stages, for example, as shown by the boxed numerals [1], [2], [3], [4], and [5] in FIG. 1. Stage [1], for example, may include receiving a set of identity information associated with a user 102. According to an example implementation, the set of identity information may (or may not) include the above-referenced characteristics about the communication channel or device 104. The set of identity information may be transmitted, for example, by a communication channel 108 (such as the Internet and/or other communication channel) and received at a server 110 in response to input from a user 102. In another example implementation, the set of identity information may be received at a server 110 via a vendor 106 in communication with the user 102.

The vendor 106, for example, may connect to the cloud or Internet communication channel 108 through a similar list of its own communication channel or device 104. For example, the vendor 106 may have its own web server or mobile device that connects to the cloud or Internet communication channel 108 using a variety of device options.

Stage [2] of the process 100 may include querying one or more databases 114 with at least a portion of the set of identity information to obtain personally identifiable information (PII). The one or more databases 114, for example, may include one or more of the following: a public or private database, a database associated with a governmental entity, a database associated with a utility company, a database associated with a financial institution, a database associated with a credit bureau, a database associated with a publisher, etc. In certain exemplary implementations, one or more social media sources 118 may be utilized to retrieve PII and/or images based on the initial query and/or a follow-up query utilizing obtained PII. The PII and/or image information obtained from one or more of the databases 114 (for example, via a cloud, network and/or Internet connection 112) may be stored on a server 110 and indexed in a database associated with the server 110.

Target images with a connection to the PII (and/or the initial set of identity information) may be retrieved, for example, from one or more image vendors 116, social media sources 118, etc., and may be classified by the subject of the image, such as people 120, landmarks 122, or any other subject classification, including but not limited to the subject classifications as discussed above. In certain exemplary implementations, the control images (having no known connection to the PII or set of identity information) may also be classified by the subject of the image, stored on the server 110, and utilized to assemble, for presentation to the user 102, a set of images on a given question pane that share a common category with the other corresponding images on the pane, which may or may not include one or more target images.

Stage [3] of the process 100 may include producing, based at least in part on the PII, at least one question pane populated with various combinations of target and/or control images (as will be further discussed below with reference to FIGS. 2A, 2B, 3A, and 3B). The question pane, assembled with the images and presented to the user 102, may be thought of as a form of a knowledge-based authentication (KBA) identity proofing question having a personally identifiable correct answer or answers. In certain example implementations, Stage [3] may also include generating a unique correct one-time pass (OTP) code for the personally identifiable correct answer. In certain example implementations, Stage [3] may also include generating one or more incorrect answers with corresponding incorrect codes. According to an example implementation of the disclosed technology, the generation of the question pane (and/or the OTP answers and codes) may be performed by the server 110.

Stage [4] of the process 100 may include sending to the user device 104, via a first communication channel, one or more of the KBA identity proofing question panes (as produced above in Stage [3]) with various combinations of target and control images. In certain example implementations, Stage [4] may include sending, via a second communication channel, a personally identifiable correct answer with the unique correct OTP code, and the one or more incorrect answers with corresponding incorrect alphanumeric codes. In certain example implementations, Stage [4] may include receiving a response code and comparing the response code and the unique correct OTP code.

Stage [5] of the process 100 may include outputting a first indication of authentication responsive to a match between the user's response and the correct answer. Depending on the analysis of the response, or other factors where risk is determined to be higher than acceptable, the user 102 may be presented with other options or instructions to further validate his or her identity. For example, certain embodiments may include online or offline capture of identification documents (such as a driver's license, social security card, credit card, bankcard, utility bill, tax return, etc.,) for further identity verification.

The identity authentication process 100 may utilize all or part of the previously gathered, compared, analyzed, and/or scored information to determine a fraud risk score. In certain example implementations, the fraud risk score may provide additional confidence for accepting or rejecting the authentication.

If the received response from the user 102 is determined to correspond to the correct answer, the process 100 may further include initiating biometric capture of the user. For example, in certain example implementations, biometric capture may be used to associate the user 102 identity information with some type of physically verifiable (biometric) information, such as a fingerprint, a voiceprint, an iris image, a facial image, etc.

Once the user 102 satisfactorily completes the authentication process 100, future access to an account, benefit and/or service may be granted based on information such as a device ID, biometric information, etc., without having to repeat a full re-authentication process. In certain example implementations, additional verification and/or identity proofing may be triggered before granting access to an account, benefit and/or service. For example, if an authenticated user 102 attempts to access their account from a different or unknown communication channel or device 104, one or more of the previously described Stages [1]-[5] may be repeated. In certain example embodiments, periodic identity proofing images, questions, one-time passwords, multi-factor authorization, etc., may be presented to the user 102 for completion before access to the account or service is granted.

If the fraud risk score is determined to exceed a threshold (i.e., to be more risky than acceptable), the process 100 may prevent or block additional authentication steps and an indication of failure may be output. For example, in situations where the risk is determined to be higher than acceptable, the user 102 may be presented with other options or instructions to validate his or her identity.

In some implementations, the initial and/or additional authentication process steps may be controlled based on company or governmental oversight policy rather than on a risk score. For example, in order to conform to certain state laws, an authentication challenge method to verify identity may need to be based on commercially reasonable tools. In other situations, and depending on the business policy, certain transactions may require a specific type of authentication. Certain banks, for example, may require authentication for balance transfers over $10,000.

Figure 2A:
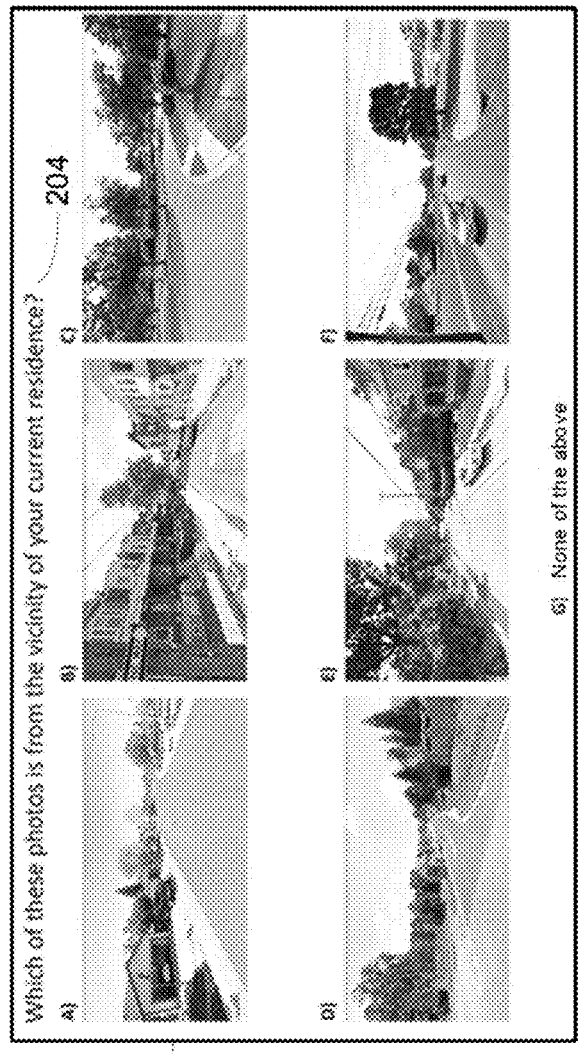
FIG. 2A depicts a question pane with a set of images characterized by a common category (i.e., neighborhoods or streets) that may be related to a user's current address for user selection, according to an example implementation of the disclosed technology.

FIG. 2A depicts an example question pane 202 generated with a set of images having a common category (i.e., neighborhoods or streets in this example). In some implementations, the question pane 202 may be generated to include zero or more images in the vicinity of a user's current residence. The question pane 202 may be presented via a user device (per Stage [4] as discussed above with reference to FIG. 1) for user selection according to the accompanying instructions 204.

Figure 2B:
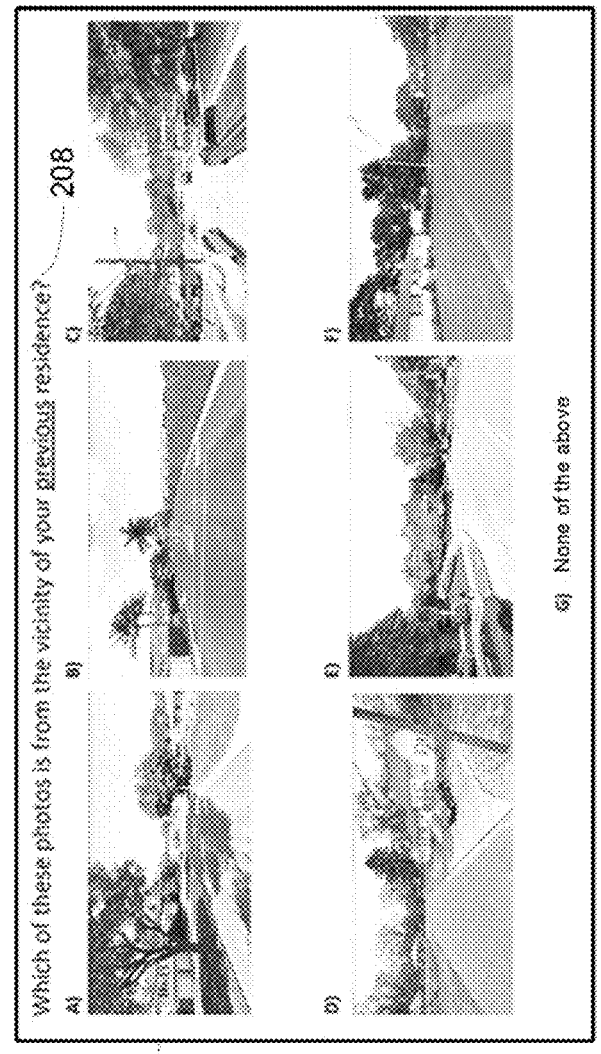
FIG. 2B depicts a question pane with a set of images that may be related to a user's previous address for user selection, according to an example implementation of the disclosed technology.

FIG. 2B depicts another example question pane 206 generated with a set of images having a common category. In some implementations, the question pane 206 may be generated to include zero or more images in the vicinity of a user's previous residence. The question pane 206 may be presented via a user device (per Stage [4] as discussed above with reference to FIG. 1) for user selection according to the accompanying instructions 208.

Figure 3A:
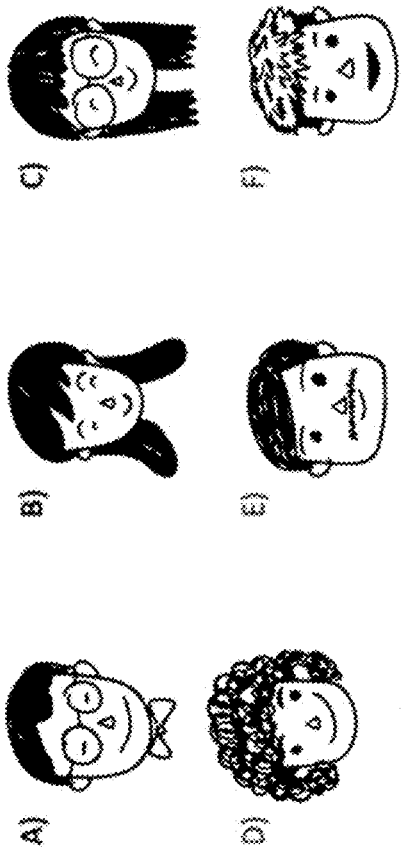
FIG. 3A depicts a question pane with a set of images of persons that may or may not be related to a user for user selection of recognized persons, according to an example implementation of the disclosed technology.

FIG. 3A depicts yet another question pane 302 generated with a set of images having a common category (i.e., persons in this example). In some implementations, the question pane 302 may be generated to include zero or more target images of people having a known connection to the user. For example, a set of identity information received from the user may be utilized to obtain independent personally identifiable information (PII) related to the user, which in turn may be used to retrieve target images of people having a connection to the user (i.e., neighbors, colleagues, relatives, friends, social network connections, etc.) The question pane 302 may be presented via a user device (per Stage [4] as discussed above with reference to FIG. 1) for user selection of recognized persons, according to the accompanying instructions 304. In certain implementations, the question pane 302 may include a target image associated with choice "A" and control images (i.e., images that have no known connection to the user) for choices "B" through "F" and the corresponding correct choice by a user would be "A" according to the accompanying directions 304 for selection.

Figure 3B:
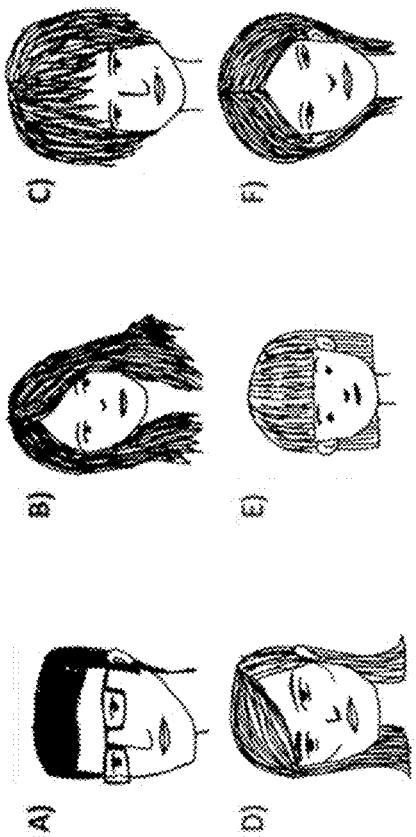
FIG. 3B depicts a question pane with a set of images that may or may not be related to a user for user selection on non-recognized persons, according to an example implementation of the disclosed technology.

FIG. 3B depicts another question pane 306 having a set of images for user selection. In this example, the user is instructed to select the images of people that the user does not recognize, according to the accompanying instructions 308.

The images selected for populating a given question pane (such as question pane 202 in FIG. 2A, question pane 206 in FIG. 2B, question pane 302 in FIG. 3A, and/or question pane 306 in FIG. 3B) can include various combinations of (a) zero or more control images having no known connection to the user, and (b) zero or more target images having a connection to the user. With reference to FIG. 2A, for example, a question pane 202 may include only control images and no target images; thus, the corresponding correct choice by a user would be "None of the above." In another example implementation, a question pane may be generated to include control images "A" through "E", and a target image "F"; thus, the corresponding correct choice would be "F." Entering a correct letter or code in response to one or more question panes, for example, may be utilized to authenticate a user's identity. In certain example implementations, authentication of the user may be confirmed if the user provides the correct answer(s) to the question(s).

In accordance with certain exemplary implementations of the disclosed technology, multiple question panes populated with target and/or control images characterized by the same, different, and/or mixed categories may be presented to a user for multiple-choice selection. In some implementations, authentication of the user's identity may require that the user review and correctly answer multiple question panes. In some implementations, if a user provides an incorrect answer, the system may generate and present additional question panes to the user. Provided the user correctly answers a predetermined number or percentage of the question panes within a limited or allotted time, the system may authenticate the user.

In accordance with certain exemplary implementations of the disclosed technology, the question panes presented to a user may be considered "multiple-choice" questions in which the images are selected based on personally identifiable information. For example, target images may be easily recognized by an authentic user but would typically require a perpetrator of identity fraud to guess the correct answer or perform time-consuming research, which could consume the time allotted for receiving an answer.

According to certain example implementations of the disclosed technology, the control and/or target images may be retrieved from any number of image sources including but not limited to public and private databases, social networks, mapping programs, etc. The target images may be selected based on a user's address history, known relatives or associates, property ownership, county tax and property records, court records, driver's license records, utility records, etc.

In certain example embodiments, the target images may be selected based on derived data from the retrieved PII information. For example, a public record source may be utilized to retrieve an address of the user, then geospatial data may be utilized to find business around the address to generate a question pane with a hospital in the vicinity of the user's address. The question pane may be accompanied by instructions such as: "Which of the following hospitals is closest to your home address?"

One objective of the disclosed technology is to raise the strength and security of the authentication process by forcing a user (who may or may not be legitimate) to provide an indication of a "knowledge" factor via selection of recognized (and/or not recognized) images. Certain implementations of the disclosed technology may provide additional security by also requiring a "possession" factor. In certain implementations, the pane(s) with control/target images may be sent to a user using various so-called "out-of-band" communication channels or combinations of channels such as by messaging, URL access, etc. For example, in one implementation, the question pane may be sent or presented to a user using one communication channel or device (such as via a browser on a desktop computer) while codes for the correct answer may be sent or presented to the user using another communication channel or device (such as via a text message on a smartphone). Such multi-channel/device communications may provide a "possession" factor for security in an authentication process.

As one-time passcodes (OTP) become more widely adopted by financial institutions looking to prevent identity theft, fraudsters have adjusted their techniques in compromising the authentication. For example, fraudsters may utilize SMS forwarding or a Trojan program that suppresses and forwards OTP messages to another device controlled by the fraudster. Likewise, a standalone knowledge-based authentication (KBA) process may be defeated by fraudsters who perform target research on the victim to learn the answers to commonly-asked life questions. By combining the "knowledge" and "possession" techniques described above, the combined strength of both solutions can be leveraged in a way that makes impersonation more difficult than either technique on its own.

In certain example implementations, the techniques as disclosed herein may provide enhanced confidence that an individual is who they claim to be based on their ability to recognize images retrieved based on PII. In accordance with an example implementation of the disclosed technology, the image/question panes may be generated based on multiple (or different) information sources so that the correct answers cannot be found in a single information source. Certain example implementations may help minimize the probability of a fraudster acquiring the necessary information to correctly answer the question.

Figure 4:
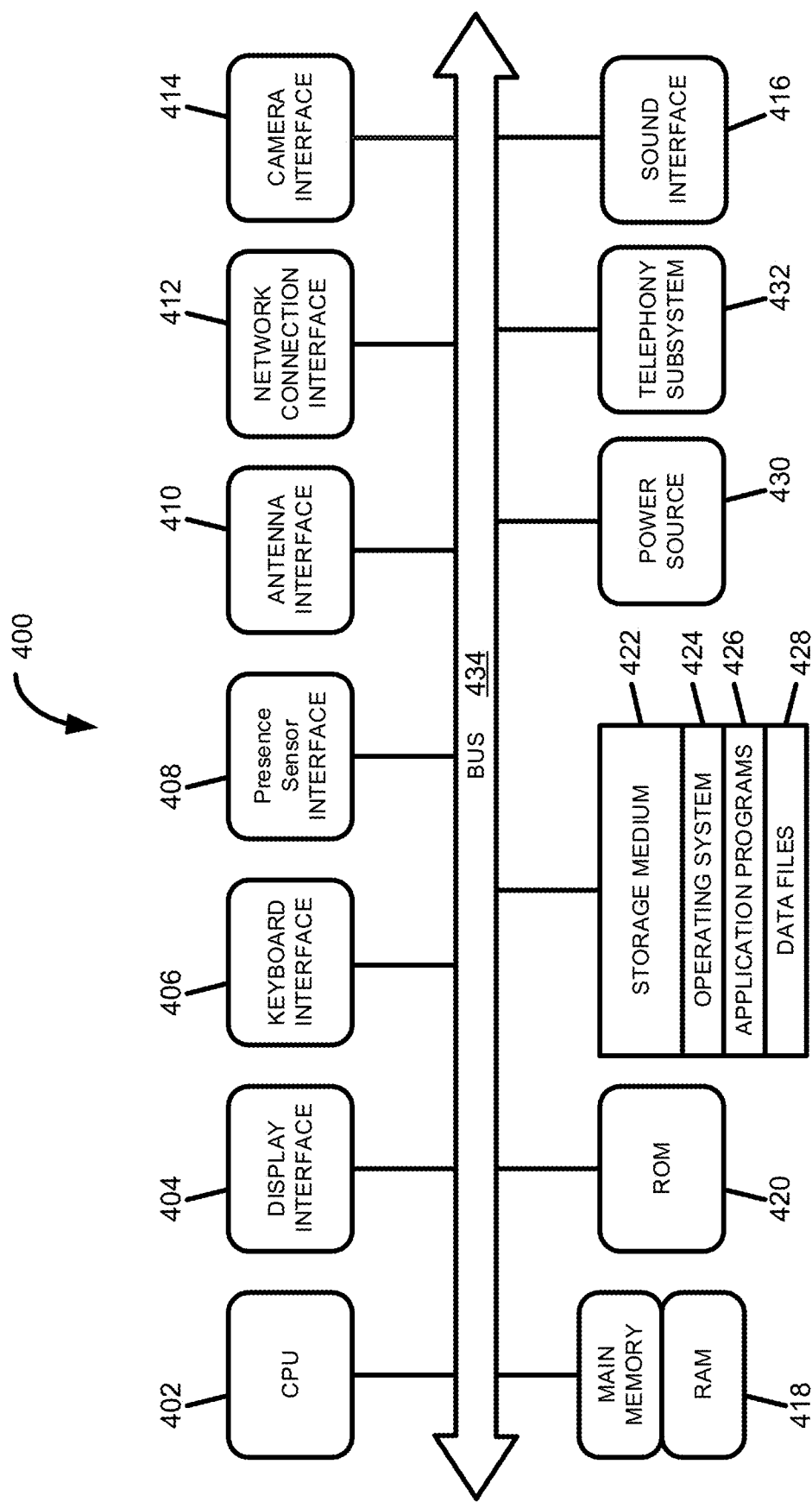
FIG. 4 is a block diagram of a computing device 400, according to an example implementation of the disclosed technology.

FIG. 4 is a block diagram of an illustrative computing device 400 that may be utilized for the identity authentication process, according to an example implementation of the disclosed technology. The computing device 400 may handle various aspects of the process, including communicating with the various entities and/or external systems involved in the authentication process. For example, the computing device 400 may communicate via one or more cloud, Internet, or other network channels to send and/or receive information and retrieve target and control images. For example, the computing device 400 may receive identity information related to the user, and independent information may be received in response to querying one or more public or private databases.

The computing device 400 of FIG. 4 includes a central processing unit (CPU) 402, where computer instructions are processed; a display interface 404 that acts as a communication interface and provides functions for rendering video, graphics, images, and texts on the display. In certain example implementations of the disclosed technology, the display interface 404 may be directly connected to a local display, such as a touch-screen display associated with a mobile computing device. In another example implementation, the display interface 404 may be configured for providing data, images, and other information for an external/remote display that is not necessarily physically connected to the computing device. For example, a desktop monitor may be utilized for mirroring graphics and other information that is presented on the computing device 400. In certain example implementations, the display interface 404 may wirelessly communicate, for example, via a Wi-Fi channel or other network connection interface 412 to an external/remote display.

In an example implementation, the network connection interface 412 may be configured as a communication interface, for example, to provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device 400 may include a keyboard interface 406 that provides a communication interface to a keyboard. In one example implementation, the computing device 400 may include a presence sensor interface 408 for interfacing with a pointing device and/or touch screen. According to certain example implementations of the disclosed technology, the presence sensor interface 408 may provide a communication interface to various devices such as a pointing device, a touch screen, a depth camera, etc. which may or may not be associated with a display.

The computing device 400 may be configured to use an input device via one or more of input/output interfaces (for example, the keyboard interface 406, the display interface 404, the presence sensor interface 408, network connection interface 412, camera interface 414, sound interface 416, etc.,) to allow a user to capture information into the computing device 400. The input device may include a mouse, a trackball, a directional pad, a trackpad, a touch-verified trackpad, a presence-sensitive trackpad, a presence-sensitive display, a scroll wheel, a digital camera, a digital video camera, a web camera, a microphone, a sensor such as an accelerometer or gyroscope, a smartcard, iris reader, fingerprint reader, voiceprint reader, and the like. Additionally, the input device may be integrated with the computing device 400 or may be a separate device.

Example implementations of the computing device 400 may include an antenna interface 410 that provides a communication interface to an antenna; a network connection interface 412 that provides a communication interface to a network. In certain implementations, a camera interface 414 is provided for capturing digital images, for example, from a camera. In certain implementations, a sound interface 416 is provided as a communication interface for converting sound into electrical signals using a microphone and for converting electrical signals into sound using a speaker. According to example implementations, a random-access memory (RAM) 418 is provided, where computer instructions and data may be stored in a volatile memory device for processing by the CPU 402.

According to an example implementation, the computing device 400 includes a read-only memory (ROM) 420 where invariant low-level system code or data for basic system functions such as basic input and output (I/O), startup, or reception of keystrokes from a keyboard are stored in a non-volatile memory device. According to an example implementation, the computing device 400 includes a storage medium 422 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 424, application programs 426 (including, for example, a web browser application, an invoice extraction module, etc.) and data files 428 are stored. According to an example implementation, the computing device 400 includes a power source 430 that provides an appropriate alternating current (AC) or direct current (DC) to power components. According to an example implementation, the computing device 400 may include and a telephony subsystem 432 that allows the device 400 to transmit and receive sound over a telephone network. The constituent devices and the CPU 402 communicate with each other over a bus 434.

In accordance with an example implementation, the CPU 402 has an appropriate structure to be a computer processor. In one arrangement, the computer CPU 402 may include more than one processing unit. The RAM 418 interfaces with the computer bus 434 to provide quick RAM storage to the CPU 402 during the execution of software programs such as the operating system application programs, and device drivers. More specifically, the CPU 402 loads computer-executable process steps from the storage medium 422 or other media into a field of the RAM 418 in order to execute software programs. Data may be stored in the RAM 418, where the data may be accessed by the computer CPU 402 during execution. In one example configuration, the device 400 includes at least 128 MB of RAM, and 256 MB of flash memory.

The storage medium 422 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer-readable storage media allow the device 400 to access computer-executable process steps, application programs and the like that are stored on removable and non-removable memory media, to off-load data from the device 400 or to upload data onto the device 400. A computer program product, such as one utilizing a communication system may be tangibly embodied in storage medium 422, which may comprise a machine-readable storage medium.

Figure 5C:
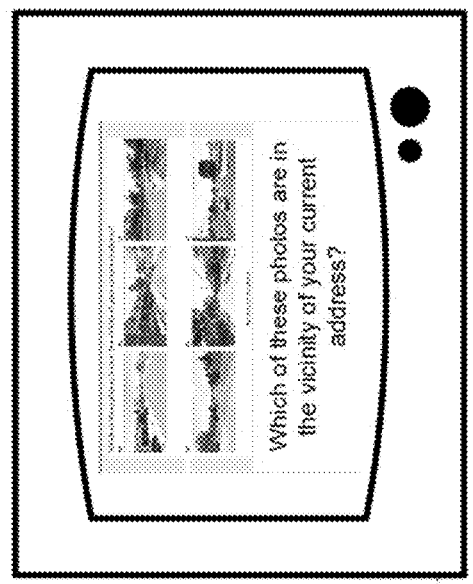
FIG. 5C depicts a question pane with a set of images presented on a computing device for selection, according to an example implementation of the disclosed technology.
Figure 5B:
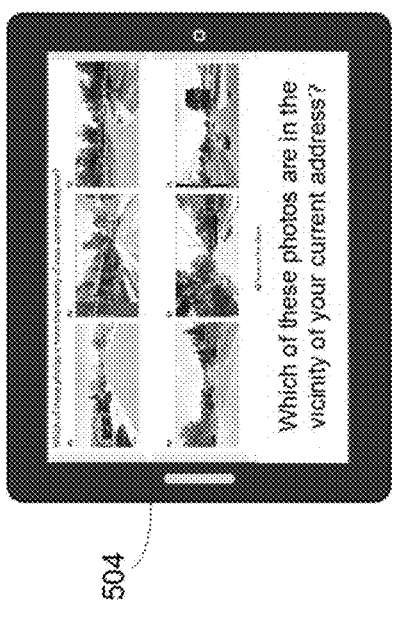
FIG. 5B depicts a question pane with a set of images presented on a user's tablet communication device for selection, according to an example implementation of the disclosed technology.
Figure 5A:
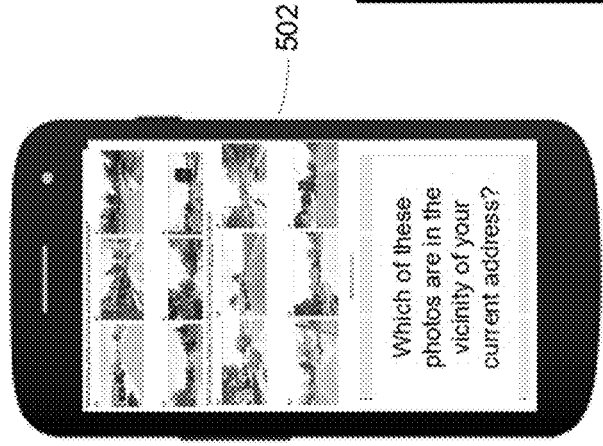
FIG. 5A depicts a question pane with a set of images presented on a user's mobile communication device for selection, according to an example implementation of the disclosed technology.

FIG. 5A depicts a question pane with accompanying instructions and a set of images presented on a user's mobile communication device 502 for selection, according to an example implementation of the disclosed technology. FIG. 5B depicts a question pane with accompanying instructions and a set of images presented on a user's tablet communication device 504 for selection, according to an example implementation of the disclosed technology. FIG. 5C depicts a question pane with accompanying instructions and a set of images presented on a user's computing device 506 for selection, according to an example implementation of the disclosed technology. The various user computing devices 502, 504, 506 may correspond to the user device 104 as discussed above with respect to FIG. 1. According to an example implementation of the disclosed technology, the various user devices may be owned by, in possession of, and/or otherwise associated with the user. In some implementations, a question pane may be sent to one user device for display, while a second user device (or communication channel) also accessible by, owned by, in possession of, and/or otherwise associated with the user may be utilized to transmit answers to the system. As may be appreciated by those of skill in the art, each additional communication device/channel that is utilized in the authentication process adds an additional layer of security to the authentication process. Certain example embodiments of the disclosed technology may utilize two or more communication devices/channels to achieve enhanced authentication security.

Figure 6:
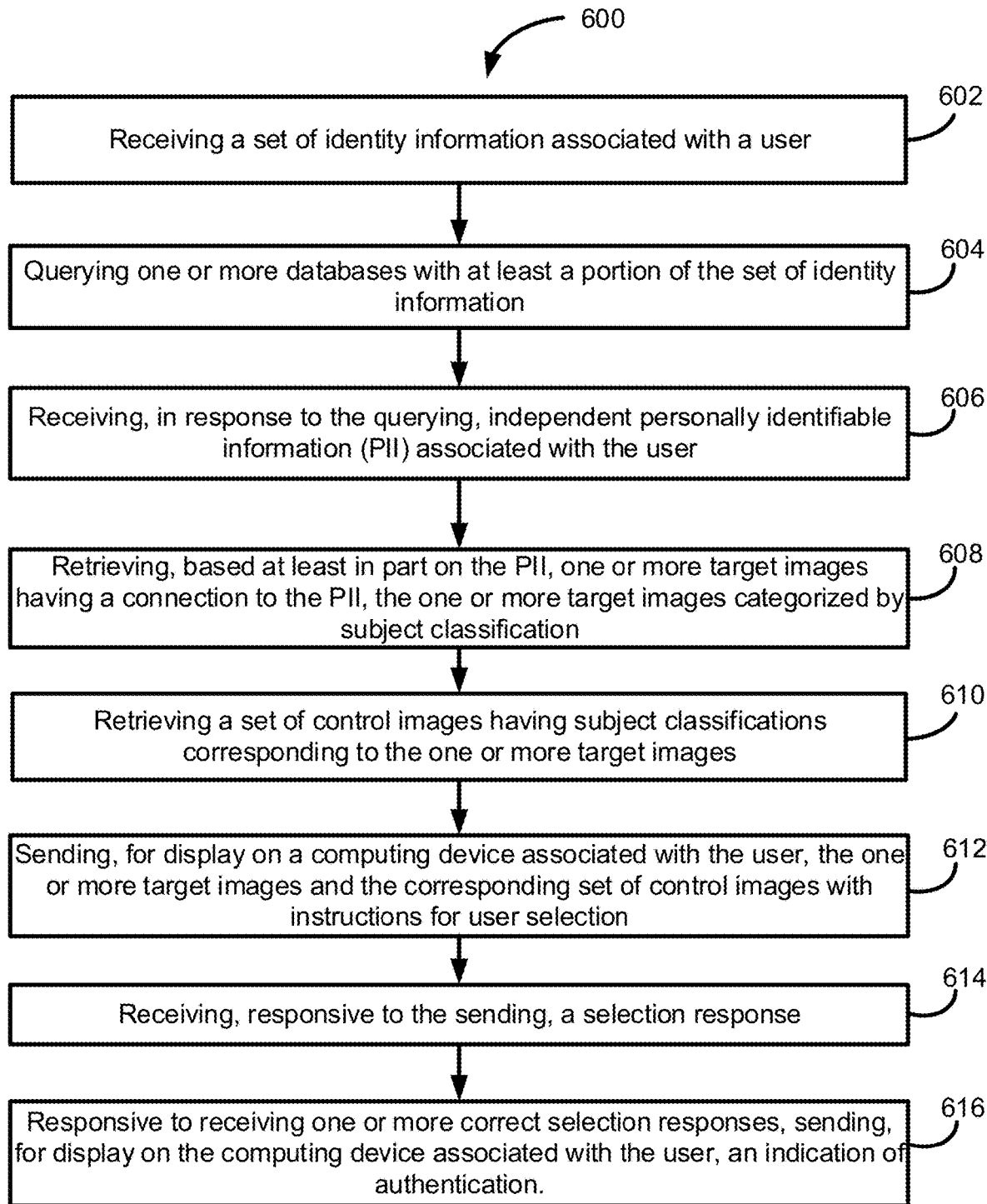
FIG. 6 is a flow diagram of a method 600, according to an example implementation of the disclosed technology.

FIG. 6 is a flow diagram of a method 600, according to an example implementation of the disclosed technology. The method 600 begins in block 602 and includes receiving a set of identity information associated with a user. In block 604, the method 600 includes querying one or more databases with at least a portion of the set of identity information. In block 606, the method 600 includes receiving, in response to the querying, independent personally identifiable information (PII) associated with the user. In block 608, the method 600 includes retrieving, based at least in part on the PII, one or more target images having a connection to the PII, the one or more target images categorized by subject classification. In block 610, method 600 includes retrieving a set of control images having subject classifications corresponding to the one or more target images. In block 612, the method 600 includes sending, for display on a computing device associated with the user, the one or more target images and the corresponding set of control images with instructions for user selection. In block 614, the method 600 includes receiving, responsive to the sending, a selection response. In block 616, and responsive to receiving one or more correct selection responses, the method 600 includes sending, for display on the computing device associated with the user, an indication of authentication.

In certain exemplary implementations, the independent PII can include one or more of current residence information, previous residence information, and/or identity information of one or more persons connected to the user. The identity information of the one or more persons connected to the user can include one or more of persons connected to the user via a social network, family members, neighbors, and/or colleagues.

In some implementations, the instructions for user selection can include instructions to select a recognizable image. In some implementations, the instructions for user selection can include instructions to select an unrecognizable image.

Certain implementations can further impose a time limit on receiving the selection response. In some implementations, the time limit is less than one minute.

In certain exemplary implementations, the identity information associated with the user is received via a user device.

In certain exemplary implementations, the subject classification can include one or more of a landmark, a street, a neighborhood, a building, a residence, a business, a church, a man-made object, natural terrain, a person, an animal, a vehicle, a product, and/or an advertisement.

In certain exemplary implementations, the target image may be an image taken from within a zip code associated with the PII.

Certain implementations can include suppressing images that are incorrectly selected by an authenticated user at a rate above a predetermined threshold.

In some implementations, and responsive to an incorrect selection response, an indication of authentication failure may be sent to the user's computing device for display.

Certain example implementations of the disclosed technology may enable effective determination and management of identity fraud risk. Certain implementations may be utilized to detect suspicious and/or fraudulent activities associated with the process of establishing a new account. For example, a user seeking to establish a new account (such as a credit account, banking account, utility account, etc.) or apply for a benefit or service (such as a tax refund, etc.) may provide a basic set of identity information such as a name, address, telephone number, social security number, etc. In an example implementation, all or part of the set of identity information may be utilized to query one or more public and/or private databases to obtain independent information. In certain example implementations, the independent information may be processed to determine/detect/score indicators of risk. According to an example implementation of the disclosed technology, account applicants who fail the authentication may not be allowed to proceed.

Certain example embodiments of the disclosed technology may allow for offline, manual, and/or custom validation of a user's identity when the user fails the authentication. For example, certain legitimate users may fail due to various factors. In these situations, it may be possible to obtain the appropriate authentication by offline, manual, and/or custom validation. For example, in one implementation, a user who fails authentication may be asked to provide additional proof of their identity. In another example implementation, a user who fails one of the stages may be asked to appear in person at a vendor location for further questioning and/or documentation.

Certain embodiments utilize non-fair credit reporting act (non-FCRA) implementations, for example, so if a user fails one or more stages, such information will not be utilized for denying employment, credit, etc. In such situations, a vendor for which the user is seeking authentication may provide other offline, manual, and/or custom validation options. However, if the user passes the authentication, then the process may be utilized to initiate the authentication, such as biometric authentication. Furthermore, if the user passes the authentication process, certain implementations of the disclosed technology may provide an efficient means for identity authentication.

Certain example implementations may identify specific types of possible identity fraud and risk levels associated with a user. For example, personal information submitted with an application may be analyzed with respect to available information in public and/or non-public records to determine the authenticity of the user's identity and/or the applicant data. According to certain implementations, the analysis may involve comparisons on multiple levels using models specific to the type of risk identified. According to certain implementations, the analysis may further identify discrepancies (if any), categorize the type of possible fraud, score the risk of fraud, and/or further evaluate the application information based on the type of risk.

Certain example implementations of the disclosed technology use a one-time passcode (OTP), which can refer to a password that can be used by a user to authenticate an account or service. In one example implementation, a user may use the OTP a single time so that future access to the account cannot be gained by the use of the same OTP. In certain example implementations, the OPT can be set to expire within a predetermined period. In an example implementation, the OTP may be utilized to authenticate a service or account. For example, a user may be asked to provide the OTP to access a service, or when a specific transaction is performed. Examples of use cases where the OTP may be utilized include online banking services, a telephone banking service, an interactive voice response (IVR) banking service, a credit card service, a bill payment service, or any other service in which a user is able to provide and/or receive sensitive information.

In certain example implementations, the OTPs generated by the authentication system can take on various forms. For example, in one implementation, the OTPs may be six characters in length and may include only numeric characters. Alternatively, in another implementation, each of the OTPs may be eight characters in length and may include case sensitive alphanumeric characters. In an example implementation, a first OTP may include five numeric characters, a second OTP may include four alphabetical characters, a third OTP may include seven alphanumeric characters, a fourth OTP may include five symbols, and so on. In certain example implementations, the OTPs can include any other number of characters and/or can include any combination of letters, numerals, and symbols.

According to certain example implementations of the disclosed technology, the identity authentication may be based on independent information, for example: whether the identity information has previously been reported; whether the address on the application matches an address previously reported; whether the social security number on the application has been previously reported with a different identity; whether the identity has only been reported by credit bureau sources; whether the identity has been the user of recent account opening inquiries; or whether the identity has a history of derogatory or high-risk events. According to an example implementation, other additional independent information may be utilized without departing from the scope of the disclosed technology.

In certain example implementations, the independent information may include source records such as property deeds, credit bureau identity files, utility connects and disconnects, driver licenses, voter registrations, phone book directories, etc. Example implementations of the disclosed technology may aggregate and process such information to locate inconsistencies and/or patterns that may further identify certain types of identity fraud.

In an example implementation, a risk score, a risk type, and/or warning codes may be generated at one or more stages of the multi-stage identity authentication process. For example, the risk score may indicate a likelihood that an application or request for service will result in fraud if the account is opened.

In accordance with certain example implementations of the disclosed technology, the applicant- or user-supplied initial set of identifying information (such as personal identity information) may be analyzed to determine if such information corresponds to conditions that indicate high identity fraud risk. For example, a social security number (SSN) can be checked to determine if it is valid or not. An invalid SSN, SSN supplied by the applicant that corresponds to a person who has been reported as deceased, an SSN issued prior to the applicant's date-of-birth; and/or an SSN used by multiple different identities would all be indicators of high identity fraud risk. Another indicator of high identity fraud risk includes multiple suspicious identities at the applicant's address. In certain example implementations, such factors may be taken into account to allow or deny the image-based authentication process to continue.

According to example implementations, the applicant's residential address history may be taken into account for determining identity fraud risk. For example, the length of residence at one or more addresses, the number of address moves, and/or the number of utility connects and disconnects may be indicators of identity fraud.

According to example implementations, certain technical effects can be provided, such as creating certain systems and methods that may reduce fraud losses and improve operational efficiency. Example implementations of the disclosed technology can provide the further technical effects of providing systems and methods for detecting identity fraud. Certain implementations of the disclosed technology may further provide the technical effects of authenticating a user's identity via a knowledge and possession process.

In certain example implementations of the disclosed technology, the identity authentication process may be implemented using any number of hardware and/or software applications that are executed to facilitate any of the operations. In example implementations, one or more I/O interfaces may facilitate communication between the identity authentication system and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the identity authentication system. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the identity authentication system inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ (owned by Telefonaktiebolaget LM Ericsson) enabled network, a Wi-Fi™ (owned by Wi-Fi Alliance) enabled network, a satellite-based network any wired network, any wireless network, etc., for communication with external devices and/or systems.

As desired, implementations of the disclosed technology may include an identity authentication system with more or less of the components illustrated in FIG. 1 or FIG. 4.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description herein uses examples to disclose certain implementations that enable any person skilled in the art to practice the disclosed technology, including making and using any devices or systems and performing any incorporated methods. The patentable scope of the disclosed technology is defined in the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer-implemented method comprising:
receiving a set of identity information associated with a user;
querying one or more databases with at least a portion of the set of identity information;
receiving, in response to the querying, independent personally identifiable information (PII) associated with the user;
retrieving, based at least in part on the PII, one or more target images having a connection to the PII, the one or more target images categorized by subject classification;

retrieving a set of control images having subject classifications corresponding to the one or more target images;

sending, for display on a computing device associated with the user, the one or more target images and the corresponding set of control images with instructions for user selection;

receiving, responsive to the sending, a selection response; and responsive to receiving one or more correct selection responses, sending, for display on the computing device associated with the user, an indication of authentication.

2. The method of claim 1, wherein the independent PII comprises one or more of:
current residence information;
previous residence information; and
identity information of one or more persons connected to the user.

3. The method of claim 2, wherein the identity information of the one or more persons connected to the user comprises one or more of:
persons connected to the user via a social network;
family members; and
colleagues.

4. The method of claim 1, wherein the instructions for user selection comprise instructions to select a recognizable image.

5. The method of claim 1, wherein the instructions for user selection comprise instructions to select an unrecognizable image.

6. The method of claim 1, further comprising imposing a time limit on receiving the selection response.

7. The method of claim 6, wherein the time limit is less than one minute.

8. The method of claim 1, wherein the set of identity information associated with the user is received via a user device.

9. The method of claim 1, wherein the subject classification comprises one or more of: a landmark, a street, a neighborhood, a building, a residence, a business, a church, a man-made object, natural terrain, a person, an animal, a vehicle, a product, and an advertisement.

10. The method of claim 1, wherein the target image comprises an image taken from within a zip code associated with the PII.

11. The method of claim 1, further comprising sending, responsive to an incorrect selection response, and for display on the computing device associated with the user, an indication of authentication failure.

12. A system comprising:
at least one memory for storing data and computer-executable instructions; and at least one processor configured to access the at least one memory and further configured to execute the computer-executable instructions that cause the at least one processor to:

receive a set of identity information associated with a user;

query one or more databases with at least a portion of the set of identity information;

receive, in response to the query, independent personally identifiable information (PII) associated with the user, retrieve, based at least in part on the PII, one or more target images having a connection to the PII, the one or more target images categorized by subject classification;

retrieve a set of control images having subject classifications corresponding to the one or more target images;

send, for display on a computing device associated with the user, the one or more target images and the corresponding set of control images with instructions for user selection;

receive, responsive to the sending, a selection response; and responsive to receiving one or more correct selection responses, send, for display on the computing device associated with the user, an indication of authentication.

13. The system of claim 12, wherein the independent PII comprises one or more of:
current residence information;
previous residence information; and
identity information of one or more persons connected to the user, wherein the identity information of the one or more persons connected to the user comprises one or more of:
persons connected to the user via a social network;
family members; and
colleagues.

14. The system of claim 12, wherein the instructions for user selection comprise instructions to select one or more of: a recognizable image, and an unrecognizable image.

15. The system of claim 12, wherein the computer-executable instructions further cause the at least one processor to impose a time limit on the selection response, wherein the time limit is less than one minute.

16. The system of claim 12, wherein the subject classification comprises one or more of: a landmark, a street, a neighborhood, a building, a residence, a business, a church, a man-made object, natural terrain, a person, an animal, a vehicle, a product, and an advertisement.

17. The system of claim 12, wherein the target image comprises an image taken from within a zip code associated with the PII.

18. The system of claim 12, wherein the computer-executable instructions further cause the at least one processor to send, responsive to an incorrect selection response, and for display on the computing device associated with the user, an indication of authentication failure.

* * * * *